July 26, 1927.

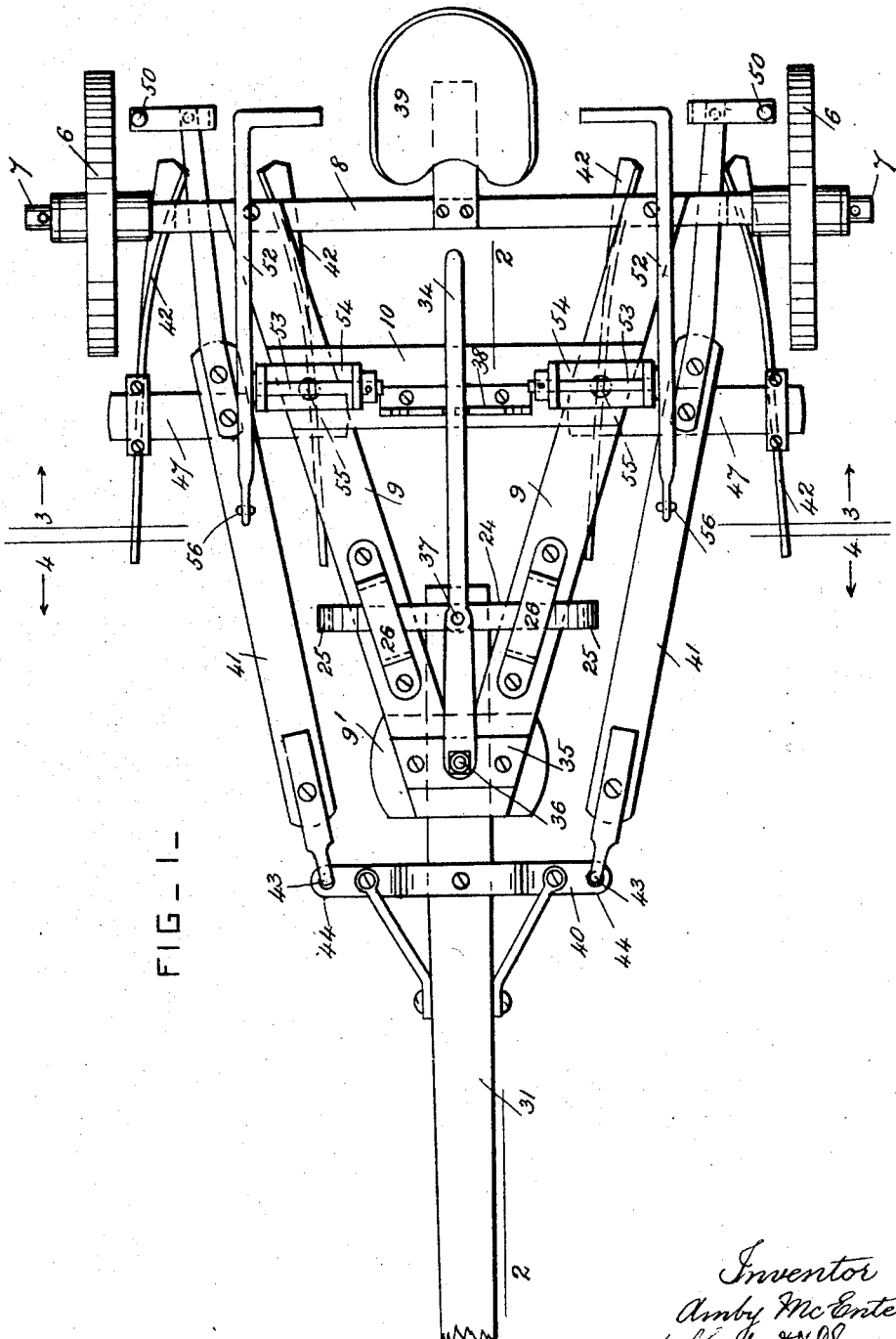

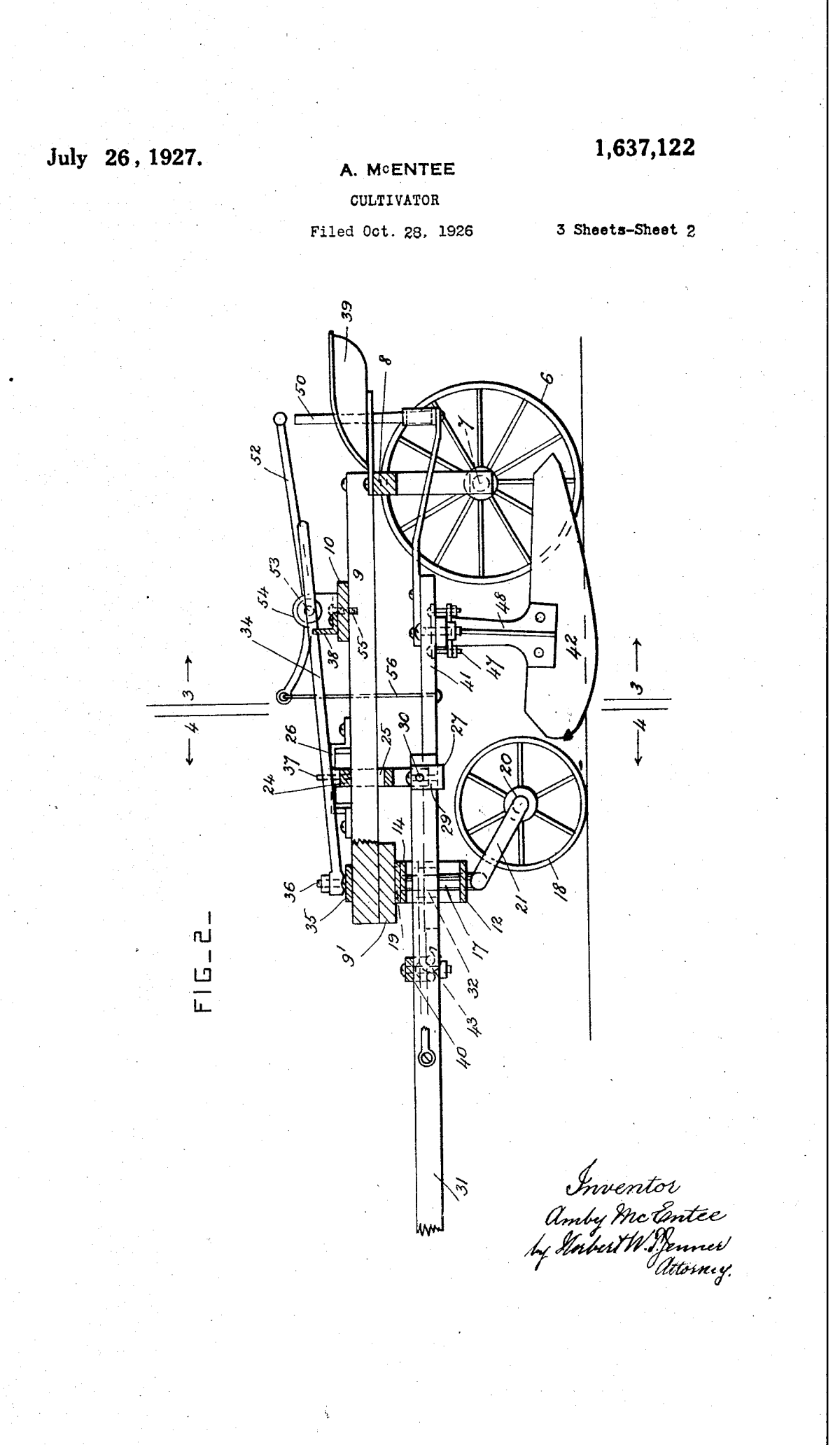

A. McENTEE

CULTIVATOR

Filed Oct. 28, 1926

1,637,122

3 Sheets-Sheet 2

FIG_2_

July 26, 1927.
A. McENTEE
1,637,122
CULTIVATOR
Filed Oct. 28, 1926
3 Sheets-Sheet 3
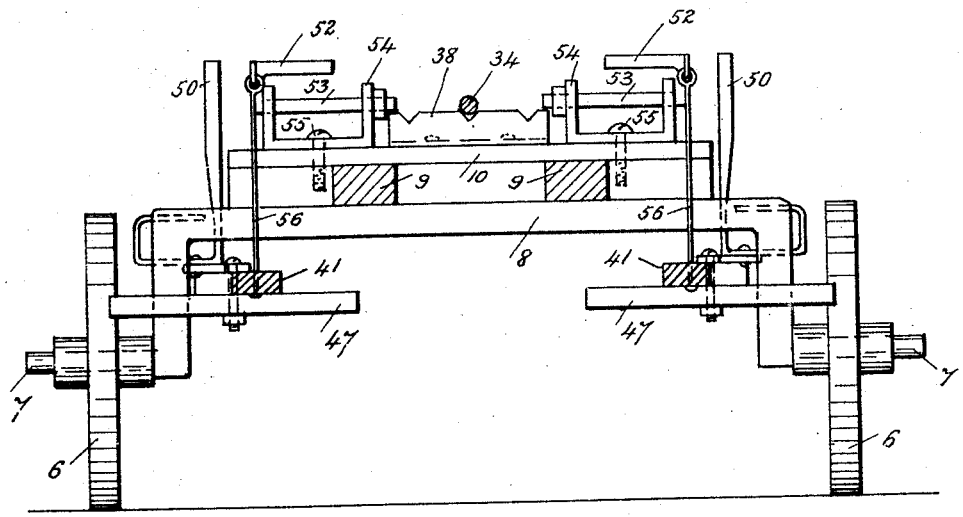
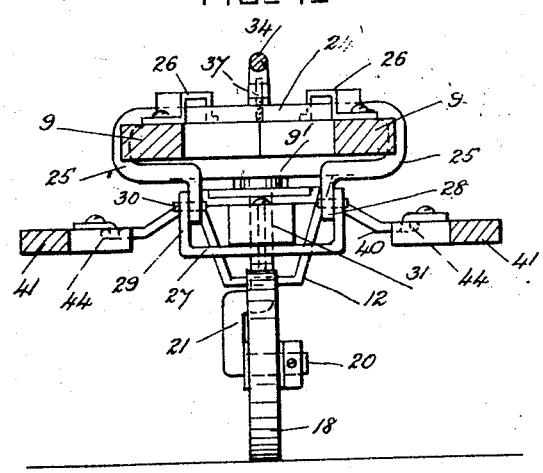
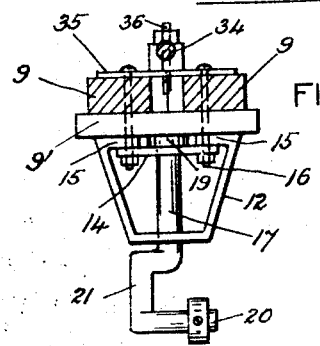
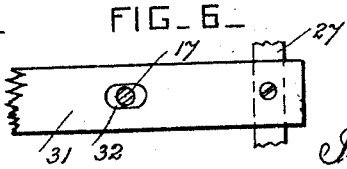
Inventor
Amby McEntee
by Herbert W. Jenner
Attorney.

Patented July 26, 1927.

1,637,122

UNITED STATES PATENT OFFICE.

AMBY McENTEE, OF WESTFIELD, MAINE.

CULTIVATOR.

Application filed October 28, 1926. Serial No. 144,778.

This invention relates to cultivators specially adapted for ridging up the earth along the sides of two rows of potatoes, but which may be used for other similar purposes; and it consists in the novel construction and combination of the parts hereinafter fully described and claimed whereby the steering of the machine is facilitated and its efficiency increased.

In the drawings, Figure 1 is a plan view of a cultivator constructed according to this invention. Fig. 2 is a longitudinal section through the cultivator, taken on the line 2—2 in Fig. 1. Fig. 3 is a cross-section through the machine, taken on the line 3—3 in Figs. 1 and 2, certain parts being omitted for clearness. Fig. 4 is a similar cross-section, taken on the line 4—4 in Figs. 1 and 2, and looking in the reverse direction to Fig. 3. Figs. 5 and 6 are details.

The machine is provided with two ground wheels 6 mounted loosely on the end portions 7 of an arch-shaped axle 8. Frame bars 9 are arranged horizontally and are secured to the axle 8, and converge towards each other at their front ends, which are secured to a block 9' placed under them. A crossbar 10 is secured to the frame bars, parallel to and in front of the axle. A loop-shaped bracket 12 is secured to the underside of the block 9' by a plate 14, which bears on the feet 15 of the bracket, and by bolts 16. A vertical shaft 17 for the caster wheel 18 is journaled in the bracket 12 and plate 14, and has a collar 19 secured on it and arranged in the space between the plate and the block to prevent the shaft from sliding vertically. The axle 20 of the caster wheel 18 is connected to the lower end of the shaft 17 by an inclined arm 21 so that the caster wheel may support the front part of the machine and permit it to turn freely.

An adjustable bar 24 is arranged crosswise over the frame bars 9 in front of the crossbar 10, and has curved ends 25 which extend freely around the frame bars. Guides 26 are secured to the frame bars over the bar 24, and permit it to slide freely to a limited extent in every direction upon the horizontal frame bars.

A crossbar 27 is pivoted to lugs 28 on the ends of the bar 24 by means of lugs 29 and horizontal pins 30. The draft pole 31 of the machine is secured to the crossbar 27, and projects freely through the loop-shaped bracket 12, and has a slot or hole 32 for the shaft 17 of the caster wheel to project through. The shaft has plenty of clearance in this slot or hole, so that the draft pole is free to move pivotally on the shaft, and vertically and longitudinally to a prearranged extent in the bracket. The position of the draft pole is adjusted pivotally, to adapt the machine for hillside cultivation, by means of an adjusting lever 34. The front end portion of this lever is pivoted to the front end portions of the frame bars 9 by a plate 35 and a vertical pin 36, and the lever 34 is pivoted to the adjustable bar 24 by a pin 37.

A notched plate 38 is secured to the crossbar 10, and the lever 34 is held in its central and side positions by engagement with the notches in this plate after it has been adjusted. The lever 34 is retained in the notches by gravity, and its rear end is arranged conveniently within reach of the driver. A seat 39 for the driver is arranged and supported in any convenient way.

A crossbar 40 is rigidly secured to the draft pole in front of the vertical shaft and caster wheel, and 41 are the two beams for the cultivator blades 42. These beams are pivoted to the crossbar 40 by vertical hooks or eyes 43 which engage with horizontal eyes 44 on the ends of the crossbar, so that the beams can move horizontally and vertically, and can rock or tilt to a limited extent. The cultivator blades 42 are secured to crossheads 47 on the rear parts of the beams 41 by any suitable standards 48, and the blades are arranged in pairs so that they can cultivate the earth on the two sides of two rows of potatoes as the machine is drawn along. Handles 50 are secured to the end portions of the beams, and project upwardly so that they can be grasped by the hands of driver as he sits on his seat.

Levers 52 are provided for lifting the cultivator blades when desirable. These levers are secured on the ends of horizontal rock-shafts 53 which are journaled in brackets 54. These brackets are pivoted to the end portions of the crossbar 10 over the frame bars by vertical pins 55 so that the front ends of the levers 52 can follow the lateral movements of the beams and cultivator blades. The front ends of the levers 52 are connected with the beams 41 by means of rods 56 or other suitable connections such as chains, and the rear ends of the levers 52 form handles which are conveniently arranged within the grasp of the driver.

The caster wheel greatly facilitates the turning around of the machine, and the loose connection of the rear part of the draft pole with the frame bars permits the machine to be used on uneven ground without jarring the necks of the animals which are harnessed to the draft pole. The front end of the draft pole is free to move vertically as its rear end is pivoted to the adjustable bar 24 by the horizontal pins 30.

What I claim is:

1. In a cultivator, a wheeled frame, a loop-shaped bracket secured to the front end portion of the frame, a vertical shaft mounted in the said bracket, a slidable bar mounted on the frame to the rear of the said bracket and having end portions which project below the frame, a draft pole pivotally connected with the said end portions and projecting freely through the loop-shaped bracket and engaging pivotally with the said vertical shaft, said draft pole being free to move vertically and longitudinally in the loop-shaped bracket, and two beams for supporting cultivator blades arranged one on each side of the draft pole and operatively connected with it.

2. A cultivator as set forth in claim 1, the said frame being supported on two ground wheels as its rear part, and the said vertical shaft having an inclined arm on its lower end provided with a horizontal axle, and a caster wheel mounted on the horizontal axle and supporting the front part of the frame.

3. A cultivator as set forth in claim 1, and having also an adjusting lever pivoted to the front end of the frame by a vertical pivot and pivotally connected with the said slidable bar, and means for retaining the adjusting lever in place after its position has been adjusted.

4. A cultivator as set forth in claim 1, the said draft pole having a crossbar rigidly secured to it in front of the said vertical shaft, and having the said beams pivotally connected with the end portions of the crossbar so that they are free to move vertically and laterally, and said beams having guiding handles secured to their rear parts.

5. A cultivator as set forth in claim 1, and having also brackets pivoted to the frame by vertical pins, rock-shafts mounted horizontally in the said brackets, lifting levers for the cultivator beams secured on the rock-shafts, and connections between the said levers and beams.

In testimony whereof I have affixed my signature.

AMBY McENTEE.